United States Patent [19]

O'Halloran et al.

[11] Patent Number: 4,821,494
[45] Date of Patent: Apr. 18, 1989

[54] CROP HARVESTER HAVING CONDITIONING ZONE PROVIDED WITH ENLARGED END REGIONS

[75] Inventors: Michael L. O'Halloran, Hesston; Cecil L. Case, Newton, both of Kans.

[73] Assignee: Hay & Forage Industries, Hesston, Kans.

[21] Appl. No.: 148,142

[22] Filed: Jan. 22, 1988

Related U.S. Application Data

[63] Continuation of Ser. No. 804,776, Dec. 5, 1985, abandoned.

[51] Int. Cl.[4] ............................................. A01D 82/00
[52] U.S. Cl. ..................................... 56/1; 56/DIG. 1
[58] Field of Search ...................... 56/DIG. 1, 1, 16.4, 56/192

[56] References Cited

U.S. PATENT DOCUMENTS

| | | | |
|---|---|---|---|
| 2,732,591 | 1/1956 | Whittum | 56/DIG. 1 |
| 2,947,130 | 8/1960 | Everett | 56/DIG. 1 |
| 2,997,834 | 8/1961 | Harbage et al. | 56/DIG. 1 X |
| 3,210,825 | 10/1965 | Johnston | 56/DIG. 1 |
| 3,401,507 | 9/1968 | Yetter | 56/DIG. 1 |
| 3,712,034 | 1/1973 | Praca | 56/1 |
| 4,075,822 | 2/1978 | Heckley et al. | 56/1 |

FOREIGN PATENT DOCUMENTS 672438  10/1963  Canada .......................... 56/DIG. 1

Primary Examiner—Jerome W. Massie, IV
Assistant Examiner—Matthew Smith
Attorney, Agent, or Firm—Hovey, Williams, Timmons & Collins

[57] ABSTRACT

A crop conditioning unit in a crop harvesting machine, such as a mower conditioner, has conditioning rolls configured to define a non-uniform crop conditioning zone which tapers or flares outwardly at opposite end regions thereof to a cross-sectional size greater than the generally uniform cross-sectional size of the remainder of the zone. Tapered end segments of the conditioning ribs on at least one of the rolls provide areas of relief at the opposite ends of the conditioning rolls which define the flared end regions of the non-uniform conditioning zone and accommodate passage of a correspondingly shaped crop layer through the zone without causing uneven loading of the rolls. As a result, uniform conditioning of the non-uniform crop layer can be achieved.

14 Claims, 3 Drawing Sheets

CROP HARVESTER HAVING CONDITIONING ZONE PROVIDED WITH ENLARGED END REGIONS

This application is a continuation of application Ser. No. 804,776, filed Dec. 5, 1985, abandoned.

TECHNICAL FIELD

The present invention generally relates to crop haravesting machines and, more particularly, concerns a mower conditioner having intermeshing conditioning rolls configured to provide areas of relief at opposite ends of the rolls and thereby define a non-uniform crop conditioning zone between the rolls being adapted to achieve uniform conditioning of a non-uniform crop layer having opposite edge portions of greater thickness than its main portion.

BACKGROUND

The object of a crop havesting machine called a mower conditioner is to cut a swath of standing crop, condition the cut crop uniformly, and then deposit the conditioned crop in a uniform windrow (or swath) back on the field. To condition the crop, the swath of cut crop is fed through a conditioning zone defined between a pair of conditioning rolls in the machine. The rolls typically have conditioning elements defined about their peripheries and are yieldably biased toward one another to apply sufficient pressure to adjacent portions of the crop stems to crack or crimp the stems as they pass through the zone. Crimping of the stems enhances release of moisture by the stems and curing of the stems at the same rate as the leaves of the stems while the cut and conditioned crop rests in the field. However, the view that the rolls are conventionally configured with cooperating conditioning elements having uniform height and width dimensions which, therefore, define a conditioning zone having uniform dimensions, in order to condition the crop uniformly the swath of crop being fed through the zone needs to be of generally uniform thickness.

Commercial models of mower conditioners often vary in cutting widths from eight to sixteen feet or more while the maximum operative length of the conditioning rolls is generally nine to ten feet. In view of the trend toward use of larger size equipment, a substantial porportion of mower conditioners being used today cut a crop swath which is substantially wider than the length of the conditioning rolls. This necessitates employment of means such as an auger to consolidate the cut crop into a layer of crop which is narrower in width than the swath of standing crop cut from the field. However, in the case of many, if not most, commercial mower conditioner models, the space available in the machine in which to accomplish consolidation of the swath of cut crop is too short to achieve a crop layer having generally uniform thickness. Ordinarily, the crop layer is generally thicker along its opposite longitudinal edge portions, being produced typically by wads of crop, than along its main portion. This problem is especially acute in heavy, wet crop conditions and becomes more severe as the width of the crop swath cut by the machine increases. Frequently, the thicker amount of cut crop feeding into the ends of the conditioning rolls tends to bind and accumulate there, resulting in excessive wear at the ends of the rolls.

In view that the conventional practice is to provide a crop conditioning zone having uniform dimensions, the objective of achieving substantially uniform conditioning of a significantly non-uniform crop layer is generally unattainable. Instead, the greater thickness of the crop layer at its opposite edges causes overconditioning of the crop along the opposite edges and, concurrently overloading of the yieldably biased conditioning rolls. Such overloading at the opposite ends of the rolls causes them to separate and the conditioning zone defined therebetween to enlarge uniformly which, in turn, results in underconditioning of the main portion of the crop layer passing through the zone. As a consequence, the crop layer is conditioned non-uniformly and will later cure non-uniformly in windrow form on the field.

SUMMARY OF THE PRESENT INVENTION

The present invention overcomes the aforementioned problems by providing a crop conditioning unit for a crop harvesting machine, such as a mower conditioner, having conditioning rolls configured to define a crop conditioning zone which tapers outwardly in divergent fashion, or flares, at opposite end regions thereof to a cross-sectional size greater than the generally uniform cross-sectional size of the remainder of the zone. The configuration of the rolls which produces the flared end regions of the non-uniform conditioning zone provides areas of relief at opposite ends of the conditioning rolls for accommodating passage of a non-uniform crop layer through the zone without causing uneven loading of the rolls. As a result, substantially uniform conditioning of the non-uniform crop layer, that is, one having opposite edge portions of generally greater thickness than its main portion, is achieved. In addition, a reduction in overloading of the opposite ends of the rolls results which substantially reduces wear at the roll ends.

Thus, the problem of passing a non-uniform crop layer through a uniform conditioning zone and overloading the rolls is solved by shaping at least one of the conditioning rolls in such a way that it cooperates with the other roll to define a non-uniform conditioning zone generally matched with the expected non-uniform crop layer. In particular, the conditioning zone now has a central region of a generally uniform cross-sectional size and opposite lateral end regions which flare to a cross-sectional size larger than that of the central region. The roll configuration which produces the non-uniform zone is preferably located on the upper roll and is in the form of areas of relief defined at opposite ends thereof. These relief areas provide greater space where needed so that the thicker portions of the nonuniform crop layer are accommodated at the opposite end regions of the conditioning zone.

Specifically, the areas of relief are defined by end segments of each of a plurality of helical elements in the form of ribs formed on the upper roll so as to taper outwardly to a shallower trapezoidal shaped profile than that of the uniform middle portion of each flute. Such configuration creates a gradual expansion of the space between the opposed ribs and rods of the cooperating conditioning rolls and which generally matches the expected increase in thickness of the outer edges of the crop layer and thereby accommodates its passage between the rolls.

DETAILED DESCRIPTION

In the following description, right hand and left hand references are determined by standing at the rear of the machine and facing in the direction of forward travel. Also, in the following description, it is to be understood that such terms as "forward", "rearward", "left", "upward", etc., are words of convenience and are not to be construed as limiting terms.

Figure 1:
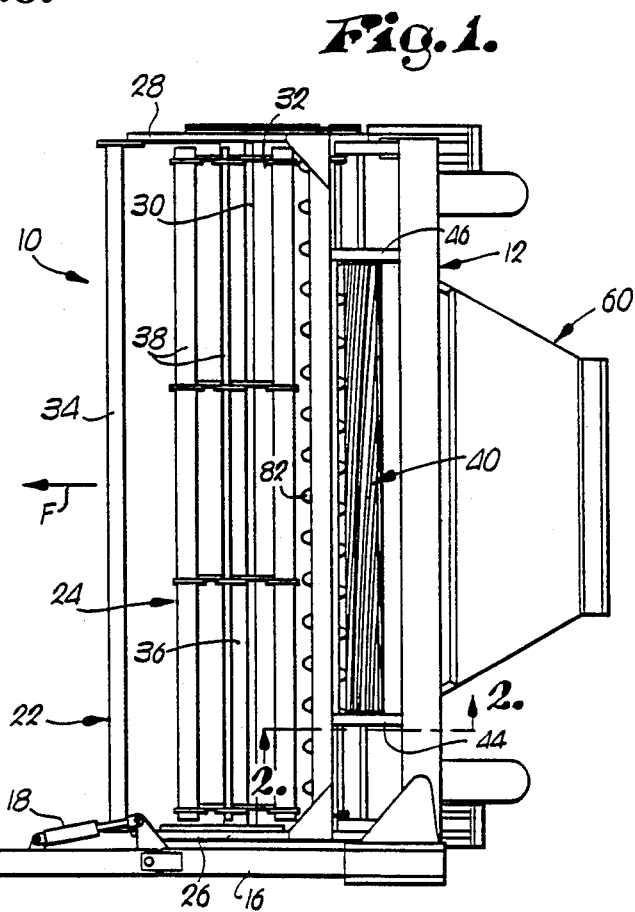
FIG. 1 is a top plan view of a mower conditioner crop harvesting machine constructed in accordance with the principles of the present invention.

Referring now to the drawings, and particularly to FIG. 1, there is shown a pull-type crop harvesting machine, such as a mower-conditioner, being indicated generally by the numeral 10 and comprising the preferred embodiment of the present invention. The machine 10 has a mobile frame 12 which generally extends in a transverse relationship to its direction of forward travel F across a field during performance of harvesting operations. An elongated tongue 14 is articulated at its rear end to a forwardly extending inboard leg 16 of the frame 12. The tongue 14 can be pivoted laterally with respect to the frame leg 16 by operation of an actuator 18, preferably in the form of a hydraulic cylinder, to convert the machine between respective transport and crop harvesting positions. The tongue has a clevis 20 on its forward end which adapts the machine 10 to be coupled to the drawbar of a towing tractor (not shown).

A header 22 is disposed forwardly of the frame 12 and extends generally transversely to the forward direction of travel F and generally parallel to the frame. The header 22 is suspended from the transverse mobile frame 12 so as to be able to float vertically on the field relative to the frame 12 and thereby follow the field contour as the machine 10 is advanced across the field during crop harvesting.

For harvesting standing crop from the field, the header 22 is provided with a reel 24 transversely extending between, and rotatably mounted at its opposite ends to, opposing left and right side walls 26, 28 of the header. A cutterbar 30 is mounted along the forward edge of an upwardly and rearwardly inclined floor 32 of the header 22 at a transversely extending position spaced below the reel 24 and just above the field. A lean bar 34 is mounted to the forward ends of the side walls 26, 28 of the header 22 so as to extend in a transverse position forwardly of the reel 24 and the cutterbar 30 and generally parallel thereto. The reel 24 is formed of a rotatably mounted central shaft 36 and a plurality of tine bars 38 supported from the shaft at circumferentially-spaced radial positions about the shaft for movement therewith. The lean bar 34 functions to engage and push the incoming crop forwardly and downwardly, permitting the crop when cut by the cutterbar 30 to be fed by the tine bars 38 of the rotating reel 24 butt (or cut) end first rearwardly and upwardly across the header floor 32.

Turning now to FIGS. 2 to 5, for conditioning the cut crop prior to its return back to the field, a pair of upper and lower corn conditioning rolls 40, 42 are mounted between rear opposite side panels 44, 46 of the header 22 for counter rotation (in the direction of the arrows seen in FIG. 4) relative to each other. The rolls 40, 42 extend transversely to the forward direction F and are located generally rearwardly of the reel 24 and the rear edge of the header floor 32. A crop conditioning zone 48 is defined between the rolls 40, 42. Each of the rolls 40, 42 is composed of a generally cylindrical body or drum 50 with opposite end shafts 52, 54 for rotatably mounting the drum. The drum 50 of the upper roll 40 has a plurality of crop conditioning elements in the form of resilient ribs 56, preferably made of molded rubber or other suitable material, attached on the periphery thereof. The ribs 56 are generally trapezoidal shaped in cross section and extend in a helical path along the periphery of the upper roll drum 50. As shown best in FIG. 5, each rib 56 has a radially inner base 57 and a pair of spaced apart side surfaces 59 which converge radially outwardly from the base 57 to a top surface 61.

The drum 50 of the lower roll 42 also has a plurality of crop conditioning elements, cut in the form of bars or rods 58, preferably made of metallic material, attached on the periphery thereof. The rods 58 are generally circular shaped in cross section and extend in a generally helical path along the periphery of the lower roll drum 50.

Figure 5:
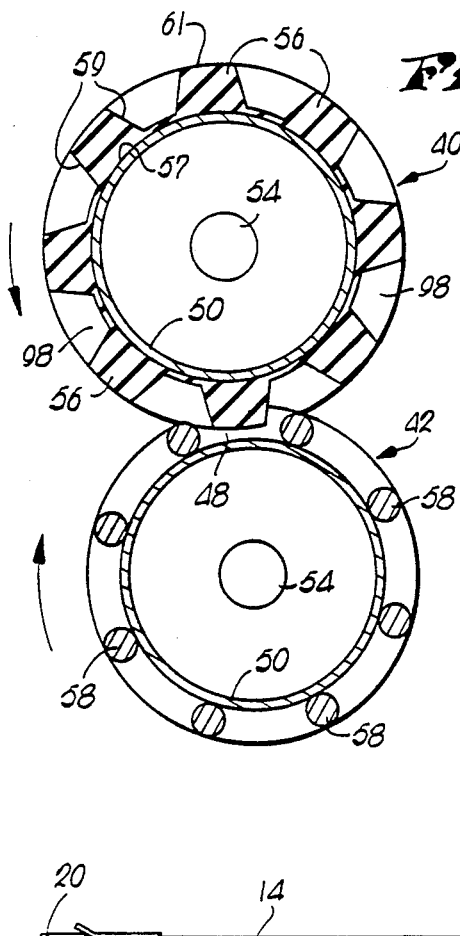
FIG. 5 is a sectional view of the crop conditioning rolls as taken substantially along line 5—5 of FIG. 3.

Depending upon the rotational timing of the rolls 40, 42 with respect to one another, and the selected circumferential spacing of the ribs 56 and the rods 58, the rolls may be made to intermesh with one another to a selected extend when the rolls 40, 42 are closest together as best seen in FIG. 5. The cut crop is fed cut-end-first through the conditioning zone 48 between the rotating rolls 40, 42, conditioned by the intermeshing ribs 56 and rods 58 as it passes therebetween, and propelled by the rotating rolls rearwardly below a windrow-forming structure 60 extending rearwardly from the machine frame 12 and deposited back on the field. Due to the yieldable mounting for the rolls 40, 42, the vertical width of the conditioning zone 48 is subject to change during harvesting operations as crop mats of varying thicknesses are fed through the machine.

Figure 2:
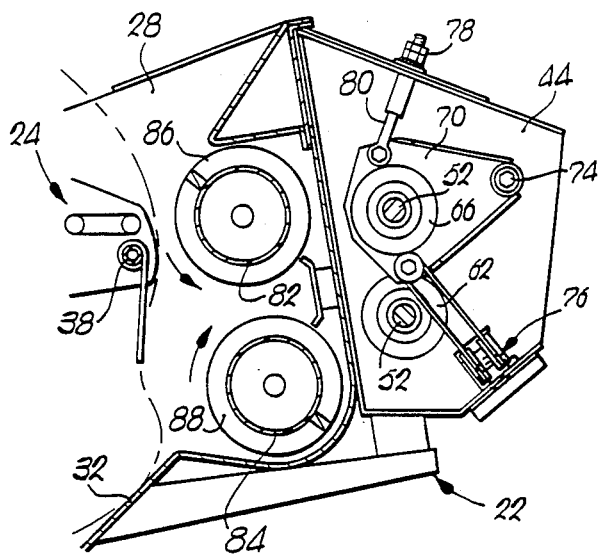
FIG. 2 is an enlarged fragmentary sectional view of the crop harvesting machine as taken along line 2—2 of FIG. 1, showing a fragmentary portion of a forwardly-positioned crop conveying reel, a pair of rearwardly-positioned upper and lower crop conditioning rolls, and a pair of upper and lower crop consolidating augers of the harvesting machine, being disposed between the conveying reel and conditioning rolls thereof.
Figure 3:
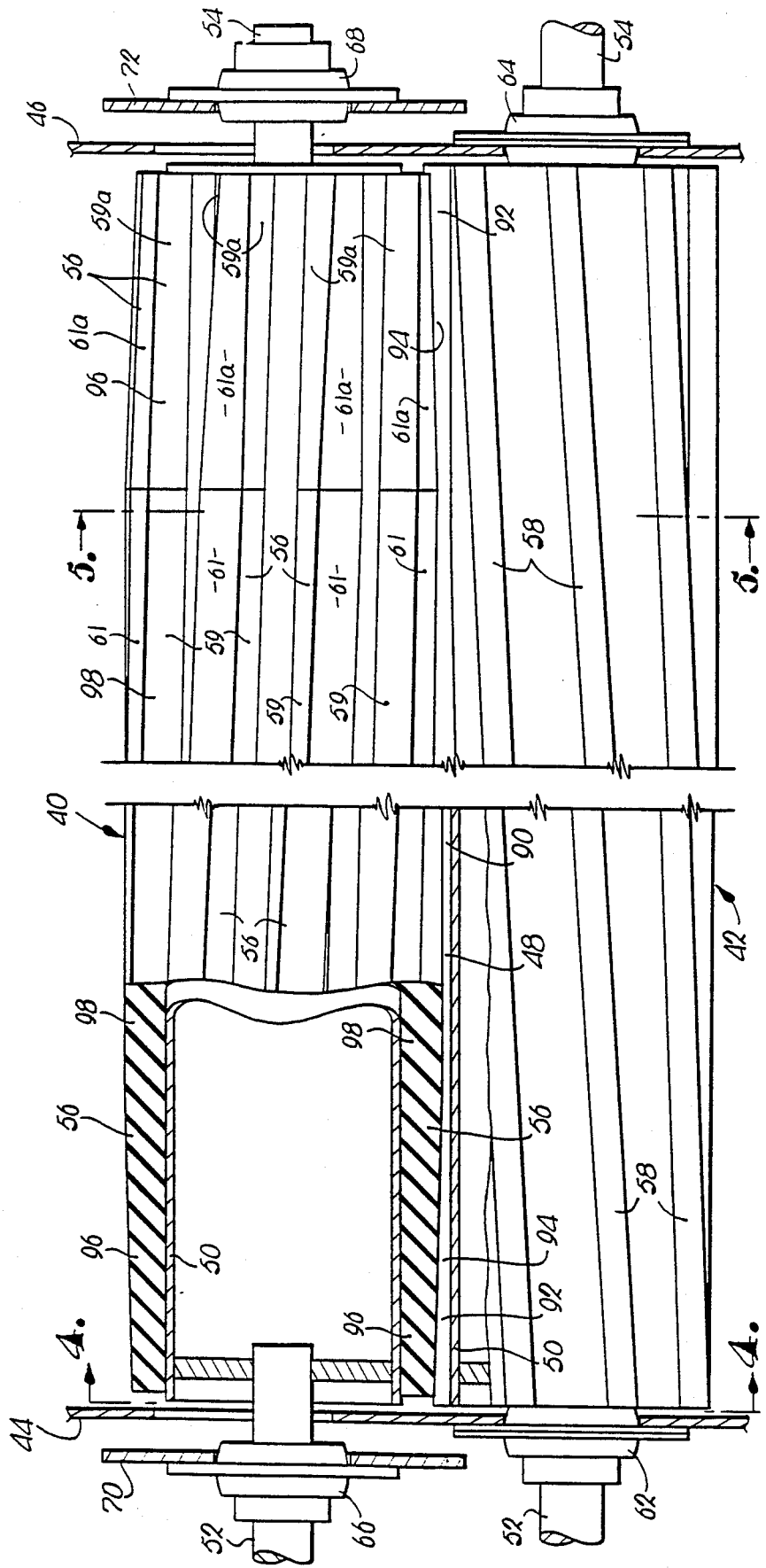
FIG. 3 is an enlarged front elevational view of the crop conditioning rolls of the harvesting machine of FIG. 1, illustrating the rolls in longitudinally foreshortened form and with parts broken away and sectioned.
Figure 6:
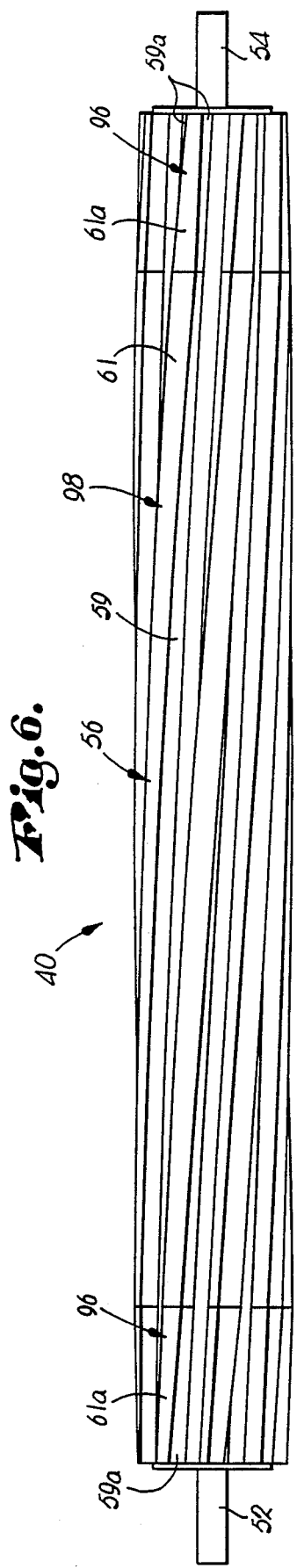
FIG. 6 is a full-length plan view of a conditioning roll constructed in accordance with the principles of the present invention.

More particularly, the lower roll 42 is mounted in a stationary position in the header 22, whereas the upper roll 40 is movable toward and away from the lower roll. As seen in FIG. 3, the opposite end shafts 52, 54 of the lower roll 42 are journalled in bearings 62, 64 attached to the opposite rear side panels 44, 46 of the header. However, the opposite end shafts 52, 54 of the upper roll 40 are journalled in bearings 66, 68 attached to opposite pivot arms 70, 72 which, in turn, are pivotally connected at 74, as seen in FIG. 2, to the side panels 44, 46. A spring and cable arrangement 76 interconnects the pivot arms 70, 72 and the mobile frame 12 and pivotally biases the upper roll 40 toward the lower roll 42. The spacing between the rolls can be adjusted by rotating a nut 78 on a bolt 80 interconnecting the pivot arms 70, 72 and the rear structure 60. From the foregoing description, it is seen that the upper conditioning roll 40 is mounted for pivotal movement toward and away from the lower conditioning roll 42 to permit foreign objects and heavy loads to crop to pass between the rolls without plugging the machine 10. At the same time, the upper roll 40 is biased toward the lower roll 42 at a sufficient level of pressure to insure adequate conditioning of the crop passing through the zone 48 between the rolls.

Due to the cutting width of the cutterbar 30 on the header 22 being much greater than the length of the conditioning rolls 40, 42, the swath of cut crop must be consolidated from its standing width into a narrower width which will generally be coextensive with the length of the conditioning rolls. For consolidating the crop, a pair of transversely extending upper and lower, vertically spaced augers 82, 84 are disposed across the header 22 between the opposite side panels 44, 46 thereof. The augers 82, 84 are mounted to the header side panels for counter rotation (in the direction of the arrows in FIG. 2) relative to one another and have respective helical flighting 86, 88 arranged to engage the crop being delivered thereto by the reel 24 and to convey and distribute the crop laterally toward the longitudinal centerline of the header 22 simultaneously as the crop is fed by the augers in a rearward direction between them to the conditioning rolls 40, 42.

However, in view that the augers 82, 84 have the same length as the cutterbar 30 and are substantially longer than the rolls 40, 42, there may be insufficient space available for the augers to both consolidate the crop and still distribute it into a narrower layer having a uniform thickness. Instead, the tendency in some crop conditions may be for the wider swath of cut crop to be consolidated by the augers 82, 84 into a layer which is substantially thicker at its opposite longitudinal edge portions than in the main, central portion thereof. The crop shifted by the augers 82, 84 from the outer lateral edge portions of the cut swath of crop into alignment with the conditioning rolls 40, 42 has to first turn the corner at opposite ends of the feed opening in the header 22 between the augers and rolls before it can be fed through the rolls. As the crop turns the corner, it may tend to accumulate at the opposite edge portions of the crop layer being formed and passed through the feed opening, while the portions of the crop in the center of the cut swath aligned with the conditioning rolls 40, 42 may tend to move only in a rearward direction straight through the augers 82, 84 to the conditioning rolls. Therefore, the outer edge portions of the crop layer passing through the conditioning zone 48 between the rolls 40, 42 may be substantially thicker than the central portion thereof.

In prior machines where the conditioning zone 48 is substantially uniform end-to-end, the thicker portions of the crop layer at the opposite edges thereof will cause the upper roll to move away from the lower roll or, in other words, cause the rolls to separate. While such increased separation may accommodate the thicker edge portions of the crop layer passing through the conditioning zone, it causes under-conditioning of the thinner middle portion of the crop layer. As a result, the crop will be non-uniformly conditioned and then non-uniformly cured on the field. In actuality, it usually also results in over-conditioning of the crop along the edge portions of the layer.

This problem of passing a non-uniform crop layer through a uniform conditioning zone and overloading the rolls is solved by modifying the configuration of the conditioning rolls 40, 42 to provide the conditioning zone 48 with a non-uniform profile generally matched with the expected non-uniform crop layer. In particular, the conditioning zone 48 has a central region 90 of a generally uniform cross-sectional size and opposite lateral end regions 92 which flare to a cross-sectional size smaller than that of the central region 90. The roll configuration which produces the non-uniform zone 48 is, preferably, located on the upper roll 40 only and is in the form of areas of relief, identified at 94, located at opposite ends thereof. These relief areas 94 provide greater space where needed so as to accommodate the thicker portions of the non-uniform crop layer at the opposite end regions 92 of the conditioning zone 48.

Figure 4:
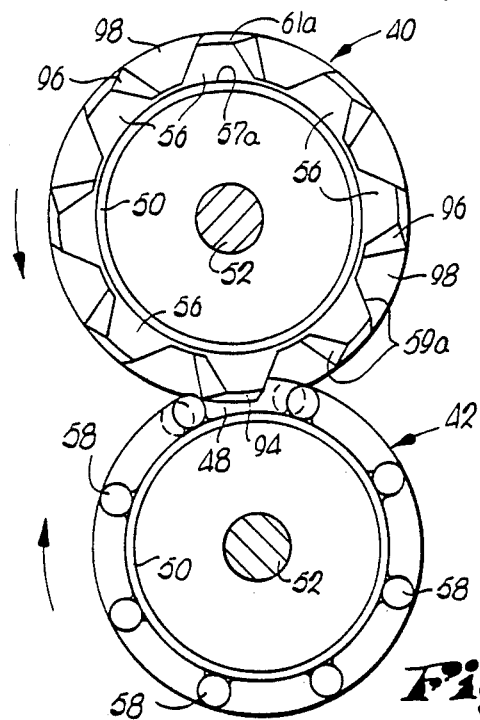
FIG. 4 is an end elevational view of the crop conditioning rolls as seen substantially along line 4—4 of FIG. 3.

Specifically, the areas of relief 94 are defined by opposing end segments 96 of the helical ribs 56 on the upper roll 40 which taper to a shallower and narrower trapezoidal-shaped profile than that of the main middle portion 98 of each rib as the ends are approached (see FIGS. 3 and 4). Note also that as the end segment 96 of each rib 56 diminishes in height as the end of the roll is approached, it also decreases in width. In this respect, while the base 57a of each rib 56 stays the same width over the full length of the roll 40, in segment 96 the rib sides 59a converge toward top surface 61a at a progressively increasing rate of convergence as the ends of roll 40 are approached. Thus, top surface 61a also tapers or progressively narrows as the ends are approached. Such configuration creates a gradual expansion of the space between the intermeshing ribs 56 and the rods 58 of the cooperating conditioning rolls 40, 42 which generally matches the expected increase in thickness of the outer edges of the crop layer and thereby accommodates its passage between the rolls. By way of example, the roll might have a total length of 110 inches, while the end segments 96 are less than eight inches in length. While only the top roll 40 is modified herein to provide the end areas of relief, it should be readily apparent that both or only the other roll 42 can be modified within the scope of the present invention. Generally speaking, it can be less costly to produce the desired taper in the rubber upper roll 40 by molding than in the steel lower roll 42 by grinding or machining.

For driving the reel 24, cutterbar 30, augers 82, 84 and conditioning rolls 40, 42, a conventional drive arrangement (not shown) is provided under the tongue 14 and at the inboard side of the mobile frame 12. The drive arrangement includes a gear box which drives the cutterbar 30, upper auger 82 and rolls 40, 42. The lower auger 84 is driven from the lower roll 42, whereas the reel 42 is driven at the outboard side of the header 22 from the lower auger.

It is thought that the crop harvesting machine of the present invention and many of its attendant advantages will be understood from the foregoing description and it will be apparent that various changes may be made in the form, construction, and arrangement thereof without departing from the spirit and scope of the invention or sacrificing all of its material advantages, the form hereinbefore described being merely a preferred or exemplary embodiment thereof.

We claim:

1. A crop conditioning roll for use in conditioning harvested crops, said roll comprising:
   an elongated body having a generally cylindrical periphery and a pair of opposite ends;
   means attached to said opposite ends of said body adapting the body to be mounted for rotational movement about the longitudinal axis thereof; and
   a plurality of crop conditioning elements on said periphery of said body between said opposite ends thereof, said body have axially extending opposite end portions which become progressively smaller in diameter as said opposite ends are approached,
   said elements comprising generally axially extending, elongated ribs spaced circumferentially about said periphery of the body,
   each of said ribs in the end portions of the body having a radially innermost base of constant width as the ends of the body are approached and a radially outermost surface of progressively decreasing width as the ends of the body are approached.

2. The roll as recited in claim 1, wherein each of said ribs has a generally trapezoidal shaped profile in cross section, said trapezoidal shaped profile of such rib in said end portions of the body becoming progressively shallower and narrower as the opposite ends of the body are approached.

3. The roll as recited in claim 1, wherein said ribs extend helically about the body.

4. A crop conditioning unit for a crop harvesting machine, comprising:
   a first crop conditioning roll having opposite ends and first crop conditioning elements defined on said roll about its periphery;
   a second crop conditioning roll having opposite ends and second crop conditioning elements defined on said roll about its periphery;
   means mounting said rolls on above the other to define a crop conditioning zone therebetween; and
   means for driving said rolls in opposite directions for cooperatively engaging and conditioning crops moving through the zone,
   at least one of said rolls being configured to render said zone non-uniform, said zone having opposite end regions of a cross-sectional size greater than a central region thereof and thereby to provide areas of relief at said opposite ends of said conditioning rolls for accommodating passage through the zone of a substantially non-uniform layer of crop having a greater thickness at its opposite edge portions than at a main portion thereof so as to achieve substantially uniform conditioning thereof,
   each of said opposite end regions tapering outwardly as said ends of the rolls are approached,
   said one roll having axially extending opposite end portions which become progressively smaller in diameter as the opposite ends of the one roll are approached,
   said elements of said one roll comprising elongated ribs spaced circumferentially about said one roll, each of said ribs having a radially innermost base of constant width as the ends of the one roll are approached and a radially outermost surface of progressively decreasing width as the ends of the one roll are approached.

5. The unit as recited in claim 4, wherein said ribs extend helically around said one roll.

6. The unit as recited in claim 4, wherein: each of said first crop conditioning elements has a longitudinal middle portion of uniform cross-sectional size and opposite end segments each of a cross-sectional size smaller than that of said longitudinal middle portion, said opposite end segments in cooperation with said second crop conditioning elements defining said opposite end regions of said conditioning zone and providing said areas of relief at said opposite ends of said conditioning rolls.

7. The unit as recited in claim 6, wherein each of said first crop conditioning elements has a generally trapezoidal shaped profile in cross section, said trapezoidal shaped profile of each opposite end segment being progressively shallower and narrower than that of said longitudinal middle portion as the opposite ends of the roll are approached.

8. A crop harvesting machine, comprising:
   means for cutting a crop swath of a first width;
   apparatus for receiving the cut crop from said cutting means and consolidating the same into a crop layer of a second width which is less than said first width, said apparatus having means associated therewith for feeding said crop layer rearwardly; and
   conditioning means disposed for receiving said crop layer from said apparatus and being configured to define a non-uniform conditioning zone through which said layer can pass for uniformly conditioning said crop, said zone having a central region of a generally uniform cross-sectional size and opposite lateral end regions which flare to a cross-sectional size larger than that of said central region for accommodating build up in the crop layer at said opposite end regions of said zone,
   said conditioning means including a pair of superimposed, oppositely rotatable crop conditioning rolls having conditioning elements disposed about their peripheries, at least one of said rolls being configured to render said zone non-uniform,
   said elements of said one roll being configured adjacent opposite ends of said one roll to provide said opposite end regions,
   said one roll having axially extending opposite end portions which become progressively smaller in diameter as the opposite ends of the roll are approached,
   said elements of said one roll comprising elongated ribs spaced circumferentially about the roll, each of said ribs having a radially innermost base of constant width as the ends of the one rolls are approached and a radially outermost surface of progressively decreasing width as the ends of the one roll are approached.

9. The machine as recited in claim 8, wherein each of said opposite end regions tapers outwardly as said ends of the rolls are approached.

10. The machine as recited in claim 8, wherein said ribs extend helically around said one roll.

11. The machine as recited in claim 8, wherein: each of said crop conditioning elements of said one roll has a longitudinal middle portion of uniform cross-sectional size and opposite end segments each of a cross-sectional size smaller than that of said longitudinal middle portion, said opposite end segments in cooperation with said crop conditioning elements on the other roll defining said opposite end regions of said conditioning zone and providing said areas of relief at said opposite ends of said conditioning rolls.

12. The roll as recited in claim 11, wherein each of said elements on said one roll has a generally trapezoidal-shaped profile in cross section, said trapezoidal-shaped profile of each opposite end segment being shallower and narrower than that of said longitudinal middle portion.

13. The unit as recited in claim 4, wherein each of said ribs has a generally trapezoidal-shaped profile in cross section, the end segment of each rib having a radially inward base, an outer top surface, and a pair of spaced apart sides converging radially outwardly from said base to the top surface of the rib, the rate of convergence of said rib sides toward the top surface progressively increasing as said ends of the one roll are approached thereby causing the top surface of each rib to narrow in width as said ends of the one roll are approached.

14. The machine as recited in claim 8, wherein each of said ribs has a generally trapezoidal-shaped profile in cross section, the end segment of each of said ribs having a radially inward base, a radially outward top surface, and a pair of spaced apart sides which converge radially outwardly from said base to said top surface, the rate of convergence of said sides toward said top surface progressively increasing as said ends of the one roll are approached thereby narrowing the width of the top surface of the rib and increasing the space between the ribs as the outer ends of the one roll are approached.

* * * * *